UNITED STATES PATENT OFFICE.

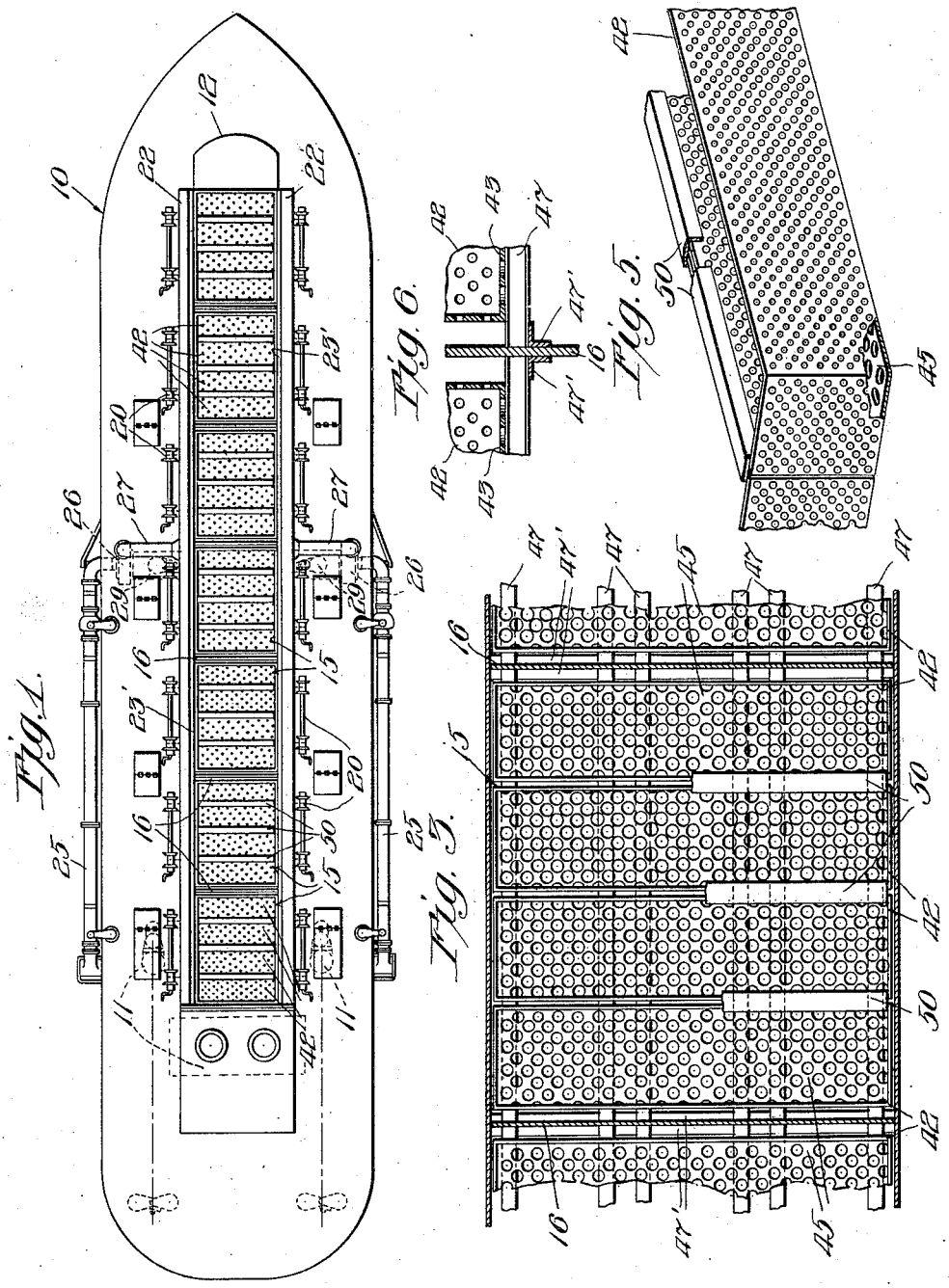

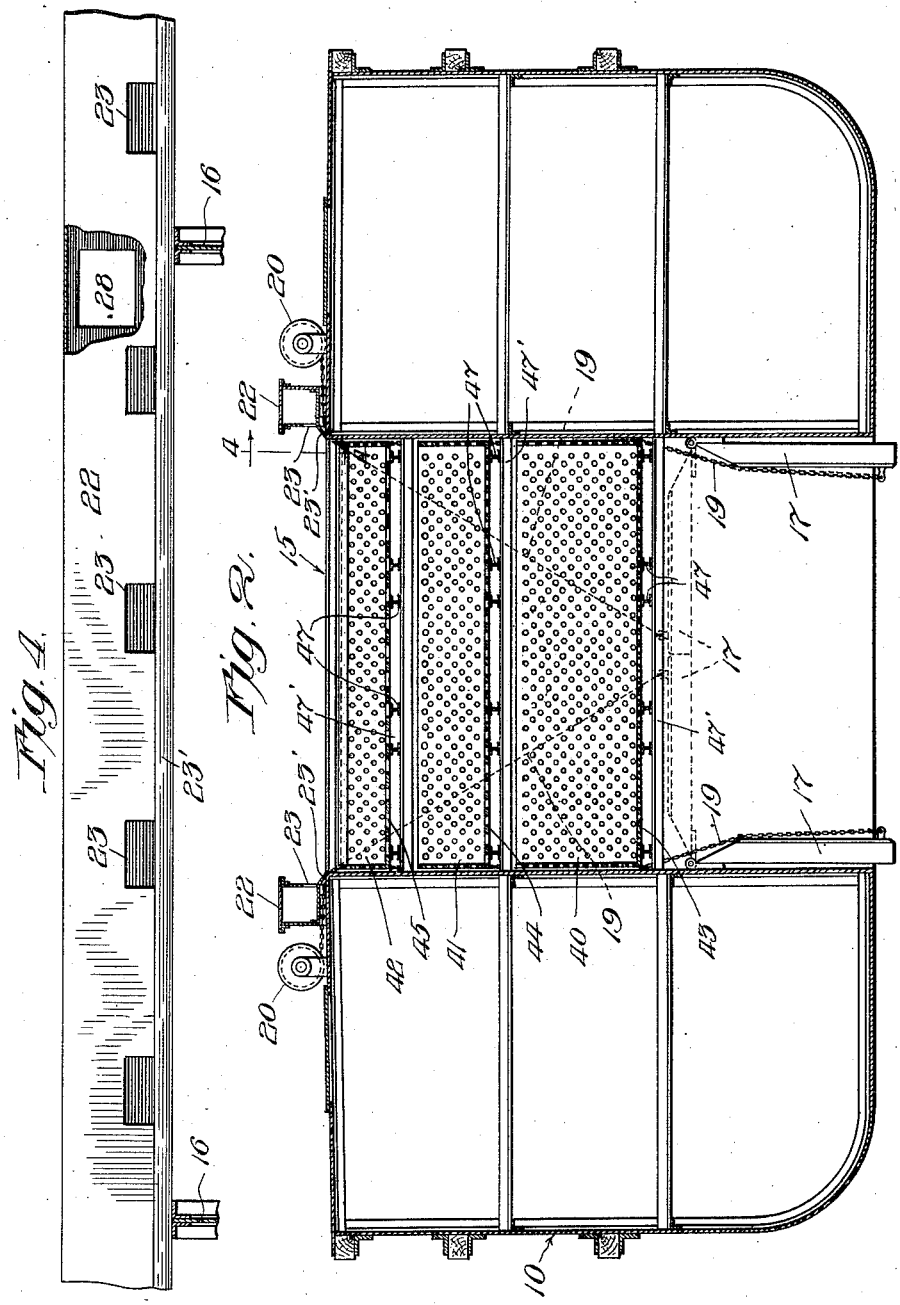

THOMAS C. JACKSON, OF CHICAGO, ILLINOIS, ASSIGNOR OF ONE-THIRD TO ROSE J. A. SHANKS, OF CHICAGO, ILLINOIS.

SCOW FOR TRANSPORTING GRAVEL AND THE LIKE.

1,018,566.  Specification of Letters Patent.  Patented Feb. 27, 1912.

Application filed October 13, 1911. Serial No. 654,453.

*To all whom it may concern:*

Be it known that I, THOMAS C. JACKSON, a citizen of the United States, and a resident of Chicago, in the county of Cook and State of Illinois, have invented certain new and useful Improvements in Scows for Transporting Gravel and the Like; and I do hereby declare that the following is a full, clear, and exact description thereof, reference being had to the accompanying drawings, and to the characters of reference marked thereon, which form a part of this specification.

This invention relates to a novel scow or boat for transporting gravel, or gravel and sand, loaded thereon from the bottom of a lake or other body of water, and the invention relates more specifically to means for receiving the material in the compartments of the scow so as to grade the material in predetermined meshes, or to return the material which is of too fine a mesh for use back to the bottom of the body of water from which it was taken.

The invention consists in the matters hereinafter set forth and more particularly pointed out in the appended claims.

In the drawings,—Figure 1 is a plan view of a scow equipped with my invention; Fig. 2 is a transverse section thereof; Fig. 3 is a fragmentary plan view, partly broken away, of the screen equipment of one compartment and portions thereof of adjacent compartments; Fig. 4 is an enlarged detail section on the line 4—4 of Fig. 2; Fig. 5 is a perspective view of one of the screen units or boxes. Fig. 6 is an enlarged section through one of the bulk heads between compartments, showing the brackets for supporting the screens.

The scow 10 may be of any suitable or preferred construction or design, and is herein shown as a self-propelling scow, with its propelling power plant 11 located at the stern and its pilot house 12 located near the bow.

Disposed along the longitudinal center of the scow are a plurality of compartments 15, 15, seven being herein shown, which are separated from each other by the transverse bulk heads or partitions 16. Each of said compartments is provided with swinging dumping doors 17 that are hinged at their sides to the sides of the compartments at the bottom thereof. Said doors, when swung upwardly to the dotted line position shown in Fig. 2, constitute the bottoms of the compartments, and when released swing down to the full line position shown in Fig. 2 to permit the contents of the compartments to be dumped. The doors are held in their upper or closed positions by the chains 19 that are trained about the lifting windlasses 20, 20 at the sides of the compartments at the dock level of the scow.
Located above and at the sides of the compartments are flumes 22, 22 through which the mixture of water, gravel and sand is distributed to the several compartments, each flume being provided over each compartment with discharge openings 23, through which the mixture falls from the flumes to the compartments below. The mixture of water, gravel and sand is discharged into said flumes through the usual sucker pipes 25 at the sides of the scow and the pumps 26 which are located midships at the sides of the compartments 15. The outlet pipes 27, 27 of said pumps discharge centrally into the flumes through the openings 28. The engines 29, which operate said pumps, may receive steam from the boilers of the propelling power plant when the scow is self-propelled.

The construction just described constitutes, in itself, no part of the present invention, although my improvements are very advantageously adapted to said construction. The mixture of gravel, sand and water is discharged centrally into the flumes, from which the central compartment is first filled, after which the compartments toward the ends of the scow are gradually filled, in the usual manner.

The present invention relates to a peculiar form of screen equipment for screening or grading the gravel which is loaded into the compartments of the scow and for supporting the graded material. In my application for U. S. Letters Patent, filed of even date herewith, Serial No. 654,452, I have shown a screen equipment for the same purpose wherein each screen of each compartment is a plain screen, and in such construction the graded material is required to be removed by a shovel or like device. In the construction exemplifying my present invention I propose to make each screen plane of a number of box-like units, with the units nested and supported in the compartments in such a way that the units may be separately inserted into place in the compartment and be separately and independently removed when loaded. Thus the unloading of the scow is facilitated. The units or boxes may be lifted from the scow and the contents thereof dumped, or the units may be loaded upon suitable vehicles and transported thereon to a place where the gravel is to be used. As herein shown each compartment is provided with three sets of screen boxes, 40, 41 and 42, and the bottom walls, 43, 44 and 45, respectively, of said boxes are perforated to constitute the screen planes of the compartments. The size of the openings or mesh of the perforated box bottoms are graduated from the upper to the lower boxes, the bottoms of the upper boxes having the largest perforations, those of the lowermost boxes having the smallest perforations, while the perforations of the bottoms of the intermediate boxes are of a diameter intermediate those of the upper and lower boxes. As herein shown, there are four boxes in each set, and the boxes of each set are arranged side by side and extend transversely across the compartments. When the boxes or units are thus arranged the flumes 22 are located laterally outside the planes of the sides of the compartments, and the discharge planes 23 are at the inner sides of the flumes, so as to provide clearance space between the flumes for the removal and insertion of the screen boxes. The contents of the flumes may be discharged over the inclined aprons 23' at said openings, to direct the material from the flumes into the boxes. Said boxes may be thus supported in superposed sets in the compartments in any suitable manner. As herein shown they are supported on beams 47 that extend longitudinally of the compartments, and said beams are supported at their ends on brackets 47', having the form of angle or Z-bars, that are attached to the bulk heads 16, as best shown in Figs. 2, 3 and 6. These box-supporting beams are removably supported on said brackets, so that they may be removed, together with the boxes, to clear the compartment spaces when the scow is to be used as an ordinary dumping scow, or for hauling gravel in the usual manner. When the screen boxes are arranged in sets to extend transversely across the compartments, the flumes are provided opposite to each box of the upper set with the discharge openings 23, as indicated in Fig. 4, so that the material may flow freely from the flumes to each box of the upper set of screen boxes. The invention, in its broadest aspect, is not limited, however, to the particular manner shown of nesting and supporting the screen boxes in the compartments, or to the particular manner shown of directing the mixture of water, sand and gravel to the screen boxes.

The spaces between the adjacent sides of the upper screen boxes may be closed to prevent material escaping through said spaces and directly to the water beneath the nested screen boxes. The closing of said spaces may be effected by the channel pieces 50, shown in Figs. 3 and 5, which are made of a width to be removably fitted over the upper margins of the side walls of adjacent boxes.

The vertical side and end walls of the boxes are preferably perforated, as shown in Figs. 2 and 5, to facilitate the escape of water from the material that is deposited on said screens and in said boxes. The dimensions of the perforations in the vertical walls of each box is less than that of the perforations of the screen bottom of the box, so as to prevent the escape of material through the side perforations of a mesh intended to be intercepted by the bottom perforations.

The screen boxes are provided at their end walls with lugs or rings, located preferably on the inner sides of said walls, which afford means adapted for engagement by lifting hooks or the like to lift the boxes out of the compartments.

I claim—

1. A scow having an open compartment, and a plurality of separately removable screen boxes nested in said compartment and supported on the side walls thereof, the bottoms of said boxes being perforated to constitute a screen support.

2. A scow having an open compartment and a plurality of separately removable screen boxes nested in said compartment and supported on the side walls thereof, the bottoms of said boxes being perforated to constitute a screen support, and the side walls of said boxes being also perforated to permit the escape of the water therethrough.

3. A scow having an open compartment, a plurality of removably supported superposed sets of screen boxes extending across the compartment, the bottoms of which are perforated to constitute superposed screen planes.

4. A scow having an open compartment, a plurality of superposed sets of screen boxes, the bottoms of which are perforated to constitute superposed screen planes, means for removably supporting said screen boxes in the compartment, and means extending across the spaces between the sides of the top set of boxes to prevent material falling between said boxes.

5. A scow having an open compartment, a plurality of superposed sets of screen boxes, the bottoms of which are perforated to constitute superposed screen planes, brackets on the side walls of the compartments, and beams supported on said brackets and extending beneath and supporting said screen boxes.

6. A scow provided with a longitudinally arranged series of open compartments, a longitudinal flume arranged at the side and above the compartments and a plurality of separately removable screen boxes nested and removably supported in said compartments, the bottoms of said boxes being perforated to constitute a screen support.

7. A scow provided with a longitudinally arranged series of open compartments, a longitudinal flume arranged at the side and above the compartments and a plurality of sets of superposed screen boxes extending across the compartments, the lower walls of which boxes are perforated to constitute superposed screens of graduated mesh from top to bottom, said flume being provided with outlet openings to discharge into the screen boxes.

In testimony, that I claim the foregoing as my invention I affix my signature in the presence of two witnesses, this 5th day of October A. D. 1911.

THOMAS C. JACKSON.

Witnesses:
GERTRUDE E. DOWLE,
WILLIAM L. HALL.

Copies of this patent may be obtained for five cents each, by addressing the "Commissioner of Patents, Washington, D. C."